(12) United States Patent
Liu et al.

(10) Patent No.: US 9,825,486 B2
(45) Date of Patent: Nov. 21, 2017

(54) METHODS AND SYSTEMS FOR DETECTING FOREIGN OBJECTS IN A WIRELESS CHARGING SYSTEM

(71) Applicant: ConvenientPower HK Ltd., Central (CN)

(72) Inventors: Xun Liu, Hong Kong (CN); Laurens Henricus Swaans, Hong Kong (CN); Ka Wai Paul Chan, Hong Kong (CN); Ho Kan Low, Hong Kong (CN); Wing Kwong Chan, Hong Kong (CN)

(73) Assignee: ConvenientPower HK Ltd., Hong Kong (CN)

( * ) Notice: Subject to any disclaimer, the term of this patent is extended or adjusted under 35 U.S.C. 154(b) by 0 days.

(21) Appl. No.: 14/869,597

(22) Filed: Sep. 29, 2015

(65) Prior Publication Data

US 2016/0020642 A1     Jan. 21, 2016

Related U.S. Application Data

(63) Continuation of application No. 13/628,348, filed on Sep. 27, 2012, now Pat. No. 9,178,361.

(51) Int. Cl.
*H02J 7/00*     (2006.01)
*H02J 7/02*     (2016.01)
*H02J 5/00*     (2016.01)

(52) U.S. Cl.
CPC .............. *H02J 7/025* (2013.01); *H02J 5/005* (2013.01); *H02J 7/0029* (2013.01)

(58) Field of Classification Search
CPC ........... H02J 7/025; H02J 7/0029; H02J 5/005
See application file for complete search history.

(56) References Cited

U.S. PATENT DOCUMENTS

| | | | |
|---|---|---|---|
| 4,678,994 A | 7/1987 | Davies | |
| 4,843,259 A | 6/1989 | Weisshaupt | |
| 5,079,502 A | 1/1992 | Rogacki et al. | |
| 5,619,078 A | 4/1997 | Boys et al. | |
| 5,701,067 A * | 12/1997 | Kaji | A45C 15/00 136/293 |
| 5,855,692 A * | 1/1999 | Kaji | A45C 15/00 136/245 |
| 7,233,137 B2 | 6/2007 | Nakamura et al. | |

(Continued)

FOREIGN PATENT DOCUMENTS

| | | |
|---|---|---|
| CN | 101919139 A | 12/2010 |
| CN | 102457108 A | 5/2012 |

(Continued)

OTHER PUBLICATIONS

PCT International Search Report and Written Opinion, PCT Application No. PCT/CN2013/079125, dated Oct. 17, 2013, 9 pages.

(Continued)

*Primary Examiner* — Naum B Levin
(74) *Attorney, Agent, or Firm* — Fenwick & West LLP

(57) ABSTRACT

Methods and systems are described for using detection coils to detect metallic or conductive foreign objects that can interfere with the wireless transfer of power from a power transmitter to a power receiver. In particular, the detection coils are targeted to foreign objects that are smaller than a power transmitter coil in the power transmitter.

20 Claims, 14 Drawing Sheets

(56) References Cited

U.S. PATENT DOCUMENTS

| | | | | |
|---|---|---|---|---|
| 7,347,950 | B2* | 3/2008 | Myung | C23C 26/00 216/13 |
| 7,388,756 | B1* | 6/2008 | Worl | H05K 1/118 361/679.27 |
| 7,469,838 | B2 | 12/2008 | Brooks et al. | |
| 7,554,316 | B2 | 6/2009 | Stevens et al. | |
| 7,917,086 | B2 | 3/2011 | Kondo et al. | |
| 7,952,322 | B2 | 5/2011 | Partovi et al. | |
| 8,062,797 | B2* | 11/2011 | Fisher | A61F 7/007 2/102 |
| 8,089,245 | B2 | 1/2012 | Kato et al. | |
| 8,154,278 | B2 | 4/2012 | Kurkovskiy | |
| 8,169,185 | B2* | 5/2012 | Partovi | H01F 5/003 320/108 |
| 8,269,375 | B2 | 9/2012 | Sogabe et al. | |
| 8,395,353 | B2* | 3/2013 | Wang | H02J 7/0042 320/108 |
| 8,552,593 | B2* | 10/2013 | Jung | H02J 7/0027 307/104 |
| 8,631,567 | B2* | 1/2014 | Lee | H05K 3/429 156/184 |
| 8,766,487 | B2 | 7/2014 | Dibben et al. | |
| 8,819,920 | B2* | 9/2014 | Yoon | H01F 41/041 29/602.1 |
| 9,065,423 | B2* | 6/2015 | Ganem | H03H 7/40 |
| 9,178,369 | B2* | 11/2015 | Partovi | H02J 7/025 |
| 9,379,780 | B2* | 6/2016 | Widmer | H04B 5/0037 |
| 9,482,702 | B2* | 11/2016 | Komiyama | G01R 21/006 |
| 2006/0028166 | A1* | 2/2006 | Closset | H02J 7/355 320/101 |
| 2007/0182367 | A1 | 8/2007 | Partovi | |
| 2008/0297158 | A1 | 12/2008 | Heger et al. | |
| 2009/0096413 | A1* | 4/2009 | Partovi | H01F 5/003 320/108 |
| 2009/0189600 | A1 | 7/2009 | Kurkovskiy | |
| 2009/0195333 | A1* | 8/2009 | Joannopoulos | B60L 11/182 333/202 |
| 2010/0133484 | A1* | 6/2010 | Heo | H01B 1/22 252/511 |
| 2010/0194206 | A1* | 8/2010 | Burdo | G06F 1/266 307/104 |
| 2010/0244579 | A1 | 9/2010 | Sogabe et al. | |
| 2011/0140538 | A1 | 6/2011 | Jung et al. | |
| 2011/0227527 | A1* | 9/2011 | Zhu | H02J 7/0044 320/108 |
| 2011/0241615 | A1* | 10/2011 | Yeh | H02J 7/0027 320/108 |
| 2012/0146580 | A1* | 6/2012 | Kitamura | H01F 38/14 320/108 |
| 2012/0181875 | A1 | 7/2012 | Wechlin et al. | |
| 2012/0235636 | A1 | 9/2012 | Partovi | |
| 2012/0242159 | A1* | 9/2012 | Lou | H03H 7/40 307/104 |
| 2012/0313569 | A1* | 12/2012 | Curran | F24J 2/523 320/101 |
| 2013/0057300 | A1 | 3/2013 | Bernard et al. | |
| 2013/0065018 | A1* | 3/2013 | Park | H05K 1/036 428/141 |
| 2013/0082637 | A1* | 4/2013 | Eaton | F24J 2/541 320/101 |
| 2013/0127980 | A1* | 5/2013 | Haddick | G06F 3/013 348/14.08 |
| 2013/0181724 | A1* | 7/2013 | Teggatz | G01N 27/02 324/629 |
| 2013/0257165 | A1 | 10/2013 | Singh | |
| 2014/0008974 | A1 | 1/2014 | Miyamoto | |
| 2014/0015522 | A1 | 1/2014 | Widmer et al. | |
| 2014/0191715 | A1 | 7/2014 | Wechlin et al. | |
| 2014/0253031 | A1* | 9/2014 | Duge | H02J 7/025 320/108 |

FOREIGN PATENT DOCUMENTS

| | | |
|---|---|---|
| EP | 2317625 | 5/2011 |
| EP | 2317625 A2 | 5/2011 |
| WO | WO 2010/098412 | 9/2010 |
| WO | WO 2010/098412 A1 | 9/2010 |

OTHER PUBLICATIONS

United States Office Action, U.S. Appl. No. 13/628,348, dated Feb. 26, 2015, 12 pages.

Chinese Office Action, Chinese Application No. 201380050259.0, dated Jan. 15, 2016, 6 pages (with concise explanation of relevance).

* cited by examiner

METHODS AND SYSTEMS FOR DETECTING FOREIGN OBJECTS IN A WIRELESS CHARGING SYSTEM

CROSS REFERENCE TO RELATED APPLICATIONS

This application is a continuation of U.S. patent application Ser. No. 13/628,348, (now U.S. Pat. No. 9,178,361), filed Sep. 27, 2012, the contents of which is incorporated by reference herein in its entirety.

BACKGROUND

Embodiments of the present disclosure relate generally to wireless power transfer devices. Specifically, embodiments of the present disclosure relate to methods and systems for detecting foreign objects that may interfere with a wireless charging device.

Wireless power is now widely used for charging mobile devices, charging electric vehicles, powering biomedical devices, and other applications. Wireless power transfer is implemented using a power transmitter that transfers power to a power receiver. The power receiver is often integrated with or attached to the end device being charged by the wireless power transfer system, although the power transmitter device typically is not physically attached to the end device. Electronics connected to the transmitter transform power from a power source (whether alternating current or direct current) to a suitable form to drive a power transmitter coil in the transmitter. The power is then transferred from the power transmitter coil to a power receiver coil using inductive coupling. Electronics in the receiver then condition the power from the receiver coil, generating suitable output to power the device or charge a battery connected to the device.

In an ideal wireless power transfer system, the transmitted power and received power are equal, meaning that no power is lost during transmission. However, because power is transmitted using an electromagnetic field, energy can be lost in the system when the field interacts with metal or electrically conductive parts not configured to power or charge the device. Not only does the resulting power loss lead to a reduction in efficiency of the wireless charging system, but it can also cause heating of the metal parts. This heating can, in turn, damage the device or pose a threat to the safety of the user.

SUMMARY

Embodiments of the present disclosure include methods and systems for using one or more foreign object detection coils in a wireless power transmitter system to detect the presence of a foreign object. Certain embodiments detect foreign objects without needing or receiving information from the receiver system regarding the amount of power in comparison to the amount of power transmitted. Some embodiments include a detection coil that is smaller than the power transmitter coil. This enables detection of foreign objects that are small, such as coins, rings, and other similarly sized foreign objects.

In some embodiments, one or more detection coils in a coil array are used to detect foreign objects that can interfere with the wireless transfer of power from a power transmitter coil to a power receiver coil. As with other embodiments, the coils of the coil array can be configured to have a size that is smaller than the power transmitter coil of the wireless power transfer system and preferably comparable to the size to foreign objects, thereby improving the coupling (and therefore detection sensitivity) between the foreign object detection coil and the foreign object. The coils of the detection array can be in a single layer, or multiple layers that are offset from one another to provide more thorough detection coverage.

Embodiments also can change the detection distance in the Z-direction (the direction of power transfer) by appropriately sizing the detection coil. This enables the detection coils to detect foreign objects without incorrectly identifying friendly parasitic components of the device being charged as foreign objects, in cases in which the friendly parasitic components are further away from an interface between the power transmitter system and the power receiving system.

Other parameters can also be changed to change the detection distance in the Z-direction. For example, certain embodiments use a resonant circuit that includes the detection coil. The behavior of the resonant circuit is used to identify the presence of foreign objects. It is possible to add a resistor connected in series with the detection coil (or in series with a capacitor). By adding a resistor, the quality factor of the resonant circuit is decreased, thereby also decreasing the detection distance. In another approach, the detection distance can also be adjusted by changing the frequency of the resonant circuit. The adjustment of the resonant frequency can be done by changing capacitor values in the resonant circuit, for example.

In other embodiments, the detection coils are connected to a location unit that uses the detection responses from the coils to determine a location of a foreign object.

In some embodiments, capacitors that are part of a receiver coil circuit can be charged prior to using foreign object detection coils. By "pre-charging" these capacitors, the energy absorbed by the receiver coils during the initial operation of the foreign object detection coils is reduced. This reduces the likelihood that the foreign object detection systems and methods will mistakenly identify the receiver coil and circuit as a foreign object.

The figures depict various embodiments of the present invention for purposes of illustration only. One skilled in the art will readily recognize from the following discussion that alternative embodiments of the structures and methods illustrated herein may be employed without departing from the principles of the present disclosure.

DETAILED DESCRIPTION

Overview

Embodiments described in the present disclosure include methods and systems for detecting metallic or conductive foreign objects ("foreign objects" for brevity) that can interfere with the wireless transfer of power from a power transmitter to a power receiver. In particular, foreign objects disposed between the power transmitter and the power receiver absorb some or all of the transmitted energy, thereby reducing the efficiency of the wireless charging device and/or posing a safety concern by becoming hot. This is particularly problematic for smaller foreign objects that absorb some energy, but not enough to trigger a fault terminating the power transfer. Also, the methods and systems described can be implemented inside a transmitter and work without any information from the receiver.

Foreign Object Detection Techniques

There are two broad types of foreign objects that can absorb energy transmitted by a wireless charging device. The first type includes conductive components or objects that are part of the device being powered or charged by the wireless charging device. These conductive components of the device are often called "friendly parasitic components." The second type includes conductive parts or objects that are not part of the device being charged. These are often referred to as "foreign objects."

For devices designed to accommodate wireless charging, friendly parasitic components are often configured to cause reduced or negligible safety issues. Examples of such configurations include, but are not limited to placing the friendly parasitic components away from the most intense areas of the electromagnetic field emitted by the transmitter, shielding the friendly parasitic components with a shielding layer that reduces the energy absorbed by the component, designing the friendly parasitic component to accommodate, absorb, or exhaust the thermal energy induced in the component by the transmitted energy, and/or other techniques. Furthermore, when any of these configurations are used, the friendly parasitic component will generally not be detected as a foreign object by embodiments of the present disclosure.

Figure 1:
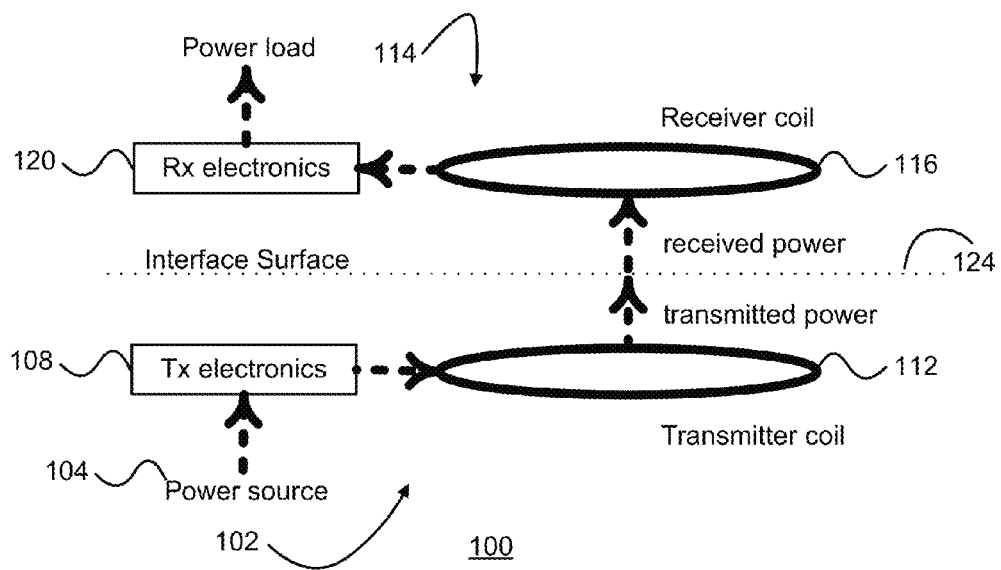
FIG. 1 is an illustration of a wireless power transmission system, in the absence of foreign objects.

FIG. 1 is an illustration of a wireless charging system 100, in the absence of foreign objects. In this example, the wireless charging system includes a transmitter system 102, which includes a power source 104, transmitter electronics 108, and a power transmitter coil 112. The system 100 also includes a receiver system 114, which includes a power receiver coil 116, and receiver electronics 120. An interface 124 separates the transmitter system 102 from the receiver system 114.

In the system 100, the power source 104 supplies the transmitter electronics 108 with power. The power can be alternating current (AC) or direct current (DC). Regardless, the transmitter electronics 108 conditions the power so that the power transmitter coil 112 receives an electrical current. The electrical current in the transmitter coil 112 produces an electromagnetic field. This electromagnetic field is represented by the "transmitted power" and the "received power" arrows in FIG. 1. This electromagnetic field is inductively coupled into the power receiver coil 116.

In this way, power is transferred across the interface 124 disposed between the power transmitter coil 112 and the power receiver coil 116. In some examples, the interface 124 is the interface between a housing that encases the transmitter coil 112 and, optionally, another housing that encases the receiver coil 116. Depending on the nature of the interface 124, the interface can absorb or otherwise attenuate the transmitted power so that the transmitted power is greater than the received power. Regardless of the reason, the power that crosses the interface 124 and reaches the power receiver coil 116, as shown by the received power arrow in FIG. 1, can be less than the transmitted power. Foreign objects located in the power transmission path can disturb the power transfer.

Figure 2A:
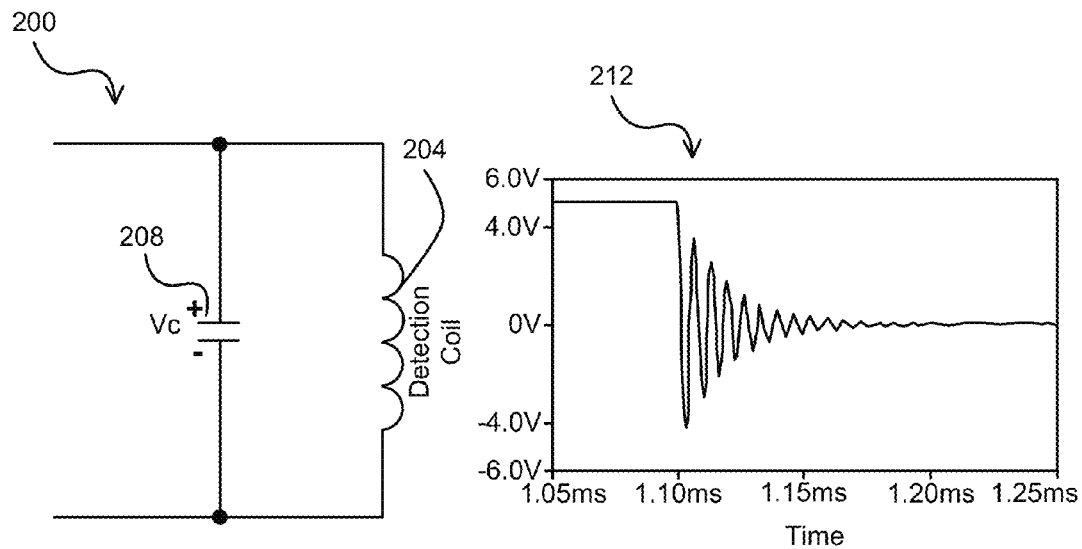
FIG. 2(a) is a circuit diagram of a foreign object detection sensor in a wireless power transmission system without a foreign object, and an accompanying waveform, in an embodiment.
Figure 2B:
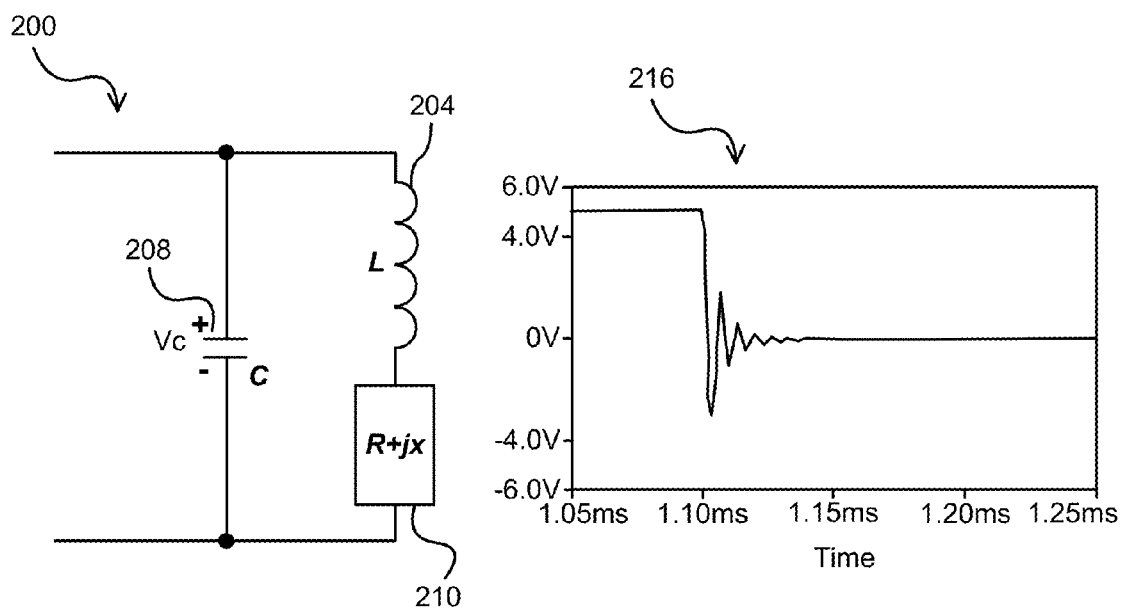
FIG. 2(b) is a circuit diagram of a foreign object detection sensor in a wireless power transmission system with a foreign object, and an accompanying waveform, in an embodiment.

Foreign objects can be detected using the principle of decay in a resonant circuit, as shown in FIGS. 2(a) and 2(b) and as described in U.S. Pat. No. 4,843,259, which is incorporated by reference herein in its entirety.

The basic principle of using decay in a resonant circuit for foreign object detection is explained as follows. As shown in FIG. 2(a), the foreign object sensor 200 includes a detection coil 204 and a capacitor 208, which together form a resonant tank circuit 200. The resonant tank circuit is charged by an external power source. After the external power source is removed, the energy stored in the resonant tank circuit 200 will oscillate between the detection coil 204 and the capacitor 208. The energy will decay with time due to the power dissipation within the detection coil, the capacitor, and any other parasitic components (e.g. PCB-traces or wires). As the power dissipation in the resonant circuit 200 itself is normally low (if the detection coil and the capacitor both have low internal resistance), the amplitude of the oscillation is relatively high and the duration of the oscillation is relatively long, as shown in the accompanying waveform 212. In this situation, the quality factor (Q) of the resonant tank circuit is high and will be referred to as Q1.

On the other hand, as illustrated in FIG. 2(b), when a metal object is proximately disposed to the detection coil 204 and is inside the electromagnetic field generated by the detection coil, an eddy current is induced in the metal object. This adds a complex impedance to the circuit and is modeled as component 'R+jX' 210. In this 'R+jX' 210 component, 'R' represents the power loss in the metal object, while 'jX' represents the change of the inductance of the detection coil 204 caused by the metal object. 'X' can be positive if the metal object is dominantly ferrous, and can also be negative if the metal object is dominantly nonferrous. Normally with the addition of 'R' into the resonant tank circuit 200, the quality factor (Q) of the circuit decreases to a lower value, Q2. In this situation, the oscillation amplitude is relatively lower and the oscillation duration is relatively shorter, as illustrated in accompanying waveform 216. That is, the response of the resonant tank circuit decays more quickly, compared to when there is no foreign object. The level of the reduction of Q or the ratio between Q2 and Q1 (Q2/Q1) depends on, for example, the material and size of the metal object, the coupling between the detection coil and the metal object, and the oscillation frequency.

The coupling between the detection coil and the metal object is determined by the relative position of the metal object to the detection coil, and the size difference between them. Normally, a larger reduction in Q or a lower value of Q2/Q1 will make the object easier to detect. In one implementation, the change in Q can be detected by comparing the oscillation shown in FIG. 2(a) to the oscillation shown in FIG. 2(b). There are other methods to detect the change of Q which can also be used.

Figure 3A:
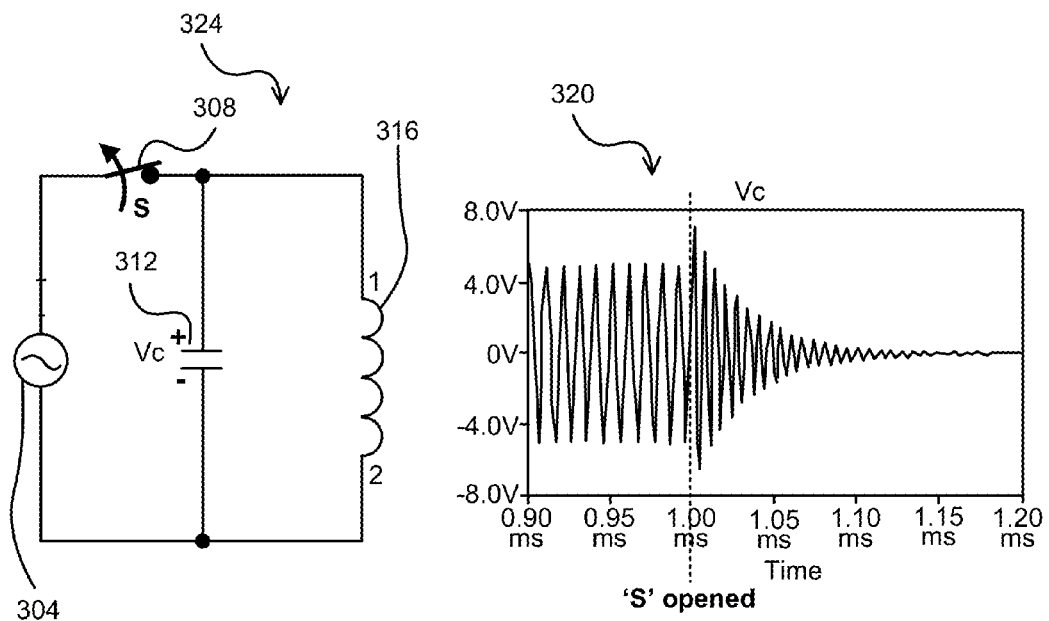
FIG. 3(a) is a circuit diagram of a foreign object detection sensor in a wireless power transmission system, and an accompanying waveform, in an embodiment.
Figure 3B:
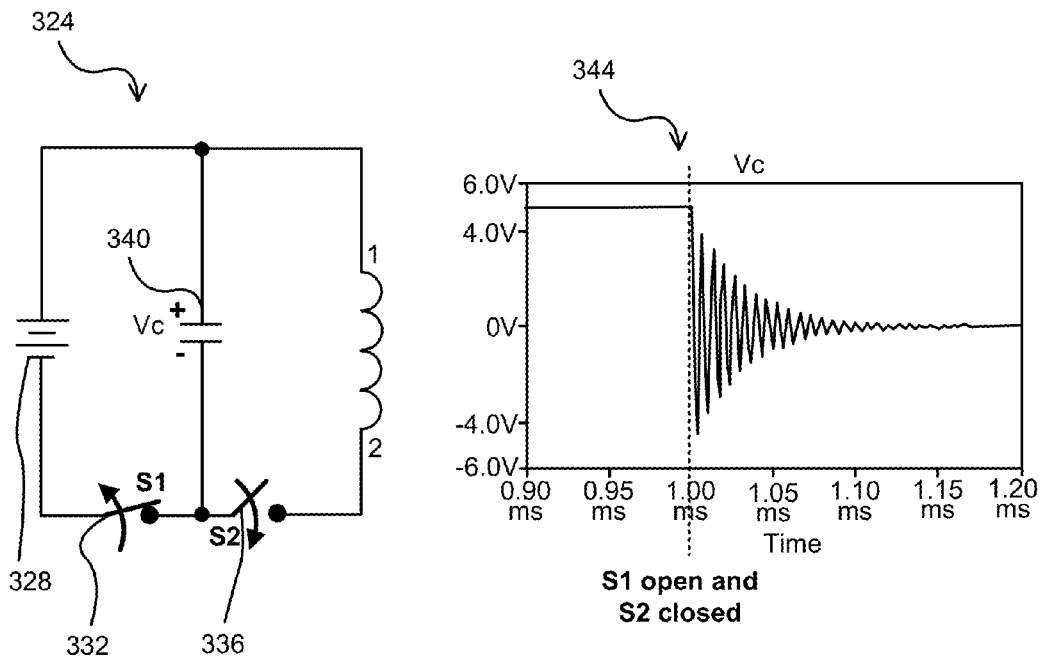
FIG. 3(b) is a circuit diagram of a foreign object detection sensor in a wireless power transmission system, and an accompanying waveform, in an embodiment.

FIGS. 3(a) and 3(b) are circuit diagrams showing alternate embodiments of a foreign object detection sensor based on the resonant tank circuit shown in FIGS. 2(a) and 2(b). Waveforms 320 and 344 are also shown corresponding to the different electrical performance of the circuits.

In FIG. 3(a) an AC power source 304 energizes the resonant tank circuit 324, whereas in FIG. 3(b) a DC power source 328 energizes the resonant tank circuit 324. In FIG. 3(a), when the switch 308 is closed, the AC power source 304 energizes the resonant tank circuit 324, resulting in a constant amplitude oscillation as shown on the lefthand side of the waveform 320. Once the switch 308 is open, the resonant tank circuit 324 oscillates in an undriven condition, decaying over time as shown on the righthand side of wavefront 320. When a foreign object is present, the response of the resonant tank circuit 324 decays more quickly, as described in FIGS. 2(a) and 2(b).

In FIG. 3(b), when switch 332 is closed and switch 336 is open, a DC power source 328 charges a capacitor 340 to a DC value, as shown on the lefthand side of waveform 344. Once switch 332 is open and switch 336 is closed, the resonant circuit 324 oscillates and decays in an undriven condition.

In both FIGS. 3(a) and 3(b), by measuring the change of the decay in the oscillation, a foreign object can be detected. However, the decay in the oscillation is not only changed by the foreign object, but also by two other factors that preferably are not to be ignored in a practical implementation. The first factor is the power dissipation in the receiver circuit, and the second factor is the power dissipation in friendly parasitic components in the device.

Using a Power Transmitter Coil for Detecting Foreign Objects

Embodiments of the present disclosure include systems and methods for a wireless power transmitter to detect the presence of a foreign object, preferably without needing or receiving information from the receiver.

Figure 4A:
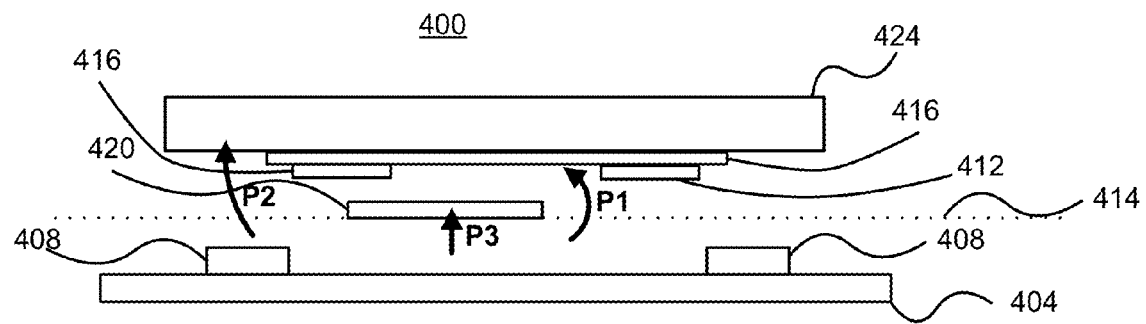
FIG. 4(a) is a cross-sectional view of a wireless power transmission system that includes representative friendly parasitic component and foreign object, in an embodiment.
Figure 4B:
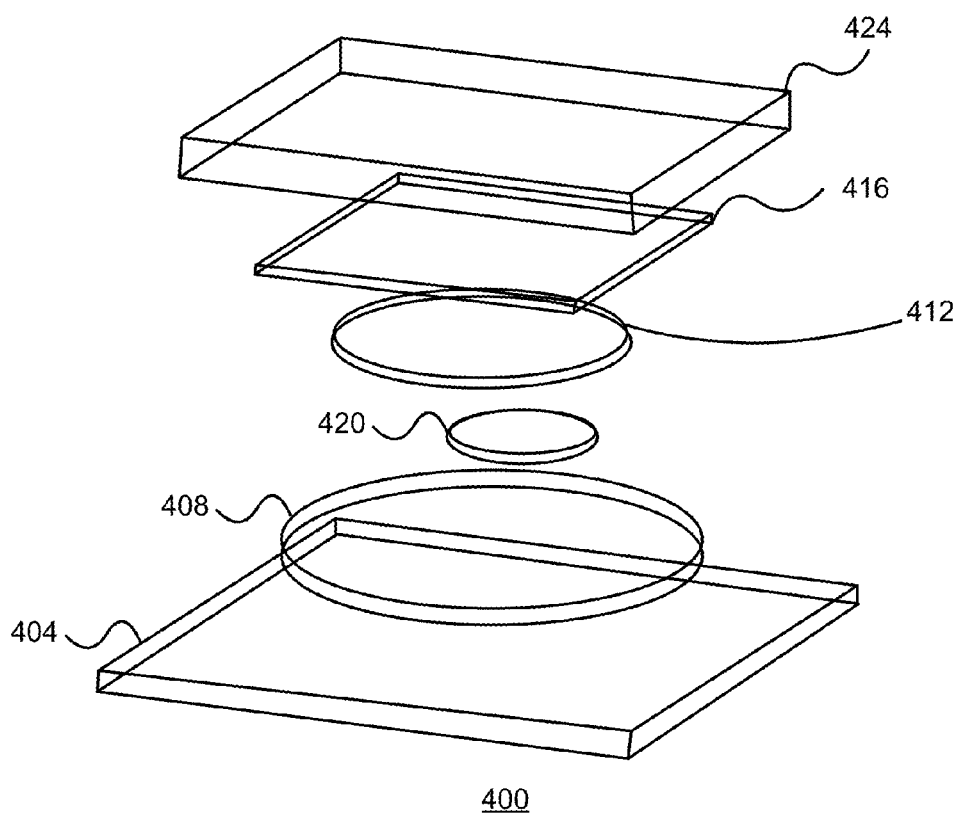
FIG. 4(b) is an exploded view of a wireless power transmission system that includes representative friendly parasitic component and foreign object, in an embodiment.

FIGS. 4(a) and 4(b) show a cross-sectional view and an exploded view, respectively, of an embodiment of a wireless power transfer system 400. On the transmitter side, the system 400 includes transmitter shielding 404 and a power transmitter coil 408. On the receiver side, the system 400 includes a power receiver coil 412, and receiver shielding 416. An interface 414 separates the transmitter coil 408 from the receiver coil 412. A foreign object 420 and a friendly parasitic component 424 are also shown. Although FIG. 4 shows the components of the wireless power arranged in a vertical stack for convenience of description, other embodiments not shown need not be configured in this way.

As shown in FIGS. 4(a) and 4(b), the wireless power transfer system often includes a friendly parasitic component 424. The friendly parasitic components in the system 400 can be directly attached to, or very close to, the receiver shielding 416. Possible sources of friendly parasitic components 424 include, but are not limited to, a battery pack (which includes a variety of metallic materials), printed circuit board wiring, and inter-component wiring. In a typical system configuration, through a magnetic field or electromagnetic field generated by the transmitter coil 408, power is transferred from the power transmitter coil 408 to the power receiver coil 416 (the power represented by arrow P1 in FIG. 4(a)), as well as partly to the friendly parasitic component 424 (the power represented by arrow P2 in FIG. 4(a)). It can be seen that the power transfer of P2 is mainly due to interaction between the electromagnetic field with the friendly parasitic components 424. There are two reasons that the energy represented by arrow P2 leaks from the system, thereby decreasing the efficiency of the wireless power transfer system 400.

First, the transmitter coil 408 and receiver coil 412, and their corresponding shielding 404 and 416, are usually not matched in dimensions. In many embodiments, the transmitter coil 408 is designed to be larger than the receiver coil 412 and the receiver shielding 416, such that the receiver coil has a wider range of acceptable charging locations with respect to the transmitter coil 408. Second, the receiver shielding 416, as shown in FIG. 4(a), typically does not completely isolate the friendly parasitic component 424 from the field P2 for practical reasons, such as cost.

The third part of the field, represented by the arrow P3, and the corresponding induced power goes into the foreign object 420. When the foreign object 420 is metal (e.g. a ring or a coin) and positioned within this field, an eddy current will be induced inside the metal object. Electromagnetic energy will be converted into electrical power loss. The metal foreign object 420 will dissipate this electrical power by becoming hot.

One way of applying the previously described oscillation and decay method to detect foreign objects in a wireless power transfer system is to use the transmitter coil 408 shown in FIGS. 4(a) and 4(b) as a foreign object detection coil. However, when the energy oscillates between the transmitter coil 408 and the added capacitor (shown in FIGS. 2(a) and 2(b) as capacitor 208), the field generated by the transmitter coil not only induces power loss in the targeted foreign object 420, but also in, for example, the friendly parasitic components 424. In other words, referring again to FIG. 2(b), the 'R+jX' component will include all these factors, which cannot be easily separated.

Using Detector Coils for Foreign Object Detection

In many cases, the foreign object can be assumed to be smaller than the friendly parasitic components 424 and/or the power transmitter coil 408. Foreign objects that are larger can be detected by other means, for example large foreign object typically will easily block most of the field or prevent or significantly reduce coupling between the power transmitter coil 408 and the power receiver coil 412, which then can trigger an automatic restriction or termination of the power transfer. Therefore, large foreign objects are less of a concern for this type of foreign object detection. The foreign objects that are more relevant to detect using these approaches are those that are small, and unintentionally positioned at, for example, the interface surface, thereby being exposed to the field. Examples of such objects can be a coin or a ring.

Applying these assumptions to the configuration shown in FIGS. 4(a) and 4(b), the power transmitter coil 408 can be larger than the targeted foreign object 420, while having similar size with the friendly parasitic component 424. In other words, because the transmitter coil has a size comparable to the friendly parasitic material and larger than a small foreign object, the transmitter coil has better coupling with the friendly parasitic component than with the foreign object. In this configuration, a detection system that uses the power transmitter coil 408 as a detection coil becomes a friendly parasitic component detector instead of a foreign object detector.

Figure 5:
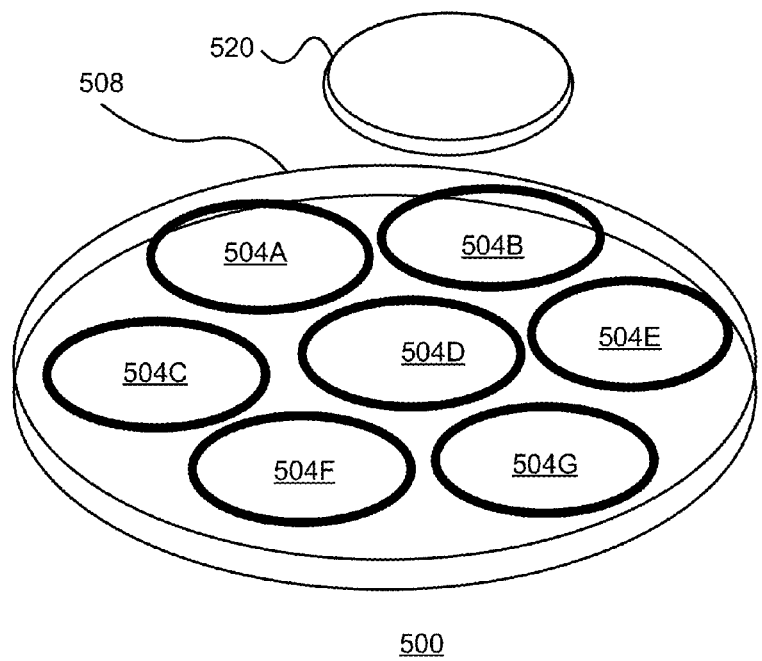
FIG. 5 is an illustration of a transmitter coil of a wireless power transmission system and an array of foreign object detection coils, in an embodiment.

FIG. 5 illustrates one embodiment of the present disclosure, in which a foreign object detection system 500 includes an array of foreign object detection (FOD) coils 504A-G (referred to as 504 for brevity). The coils 504 can be configured to have a size smaller than the power transmitter coil 508 and a comparable size to a foreign object 520, thereby improving the coupling (and therefore detection sensitivity) between the foreign object detection coil 504 and the foreign object 520. To highlight this configuration, FIG. 5 shows the transmitter coil 508, the detection coil array 504 and the foreign object 520, and omits other components of the system. As can be seen from FIG. 5, each detection coil 504 has a similar size with the targeted foreign object 520. Matching dimensions enables good coupling between them, and the foreign object can be better detected.

"Smaller" can be defined in a number of ways. For example, it may be defined by a lateral dimension appropriate to the shape of the FOD coil. For circular coils, the lateral dimension is a radius or diameter; for rectangular or square coils, the dimension can be a diagonal dimension or a length of a side. In other examples, the dimension can include a width, a maximum width, or an area. The lateral dimension may also characterize an FOD coil that is not necessarily planar: solenoidal or cylindrical coils can be characterized by a lateral dimension of one revolution of the coil and/or a length of the coil. If the FOD coils and power transmitter coils are all circular, the FOD coil may have a smaller radius than the power transmitter coil. Other standards may also be used. For example, the transmitter coil lateral dimension (width, area) may be twice or more times larger than the FOD coil lateral dimension.

Figure 6:
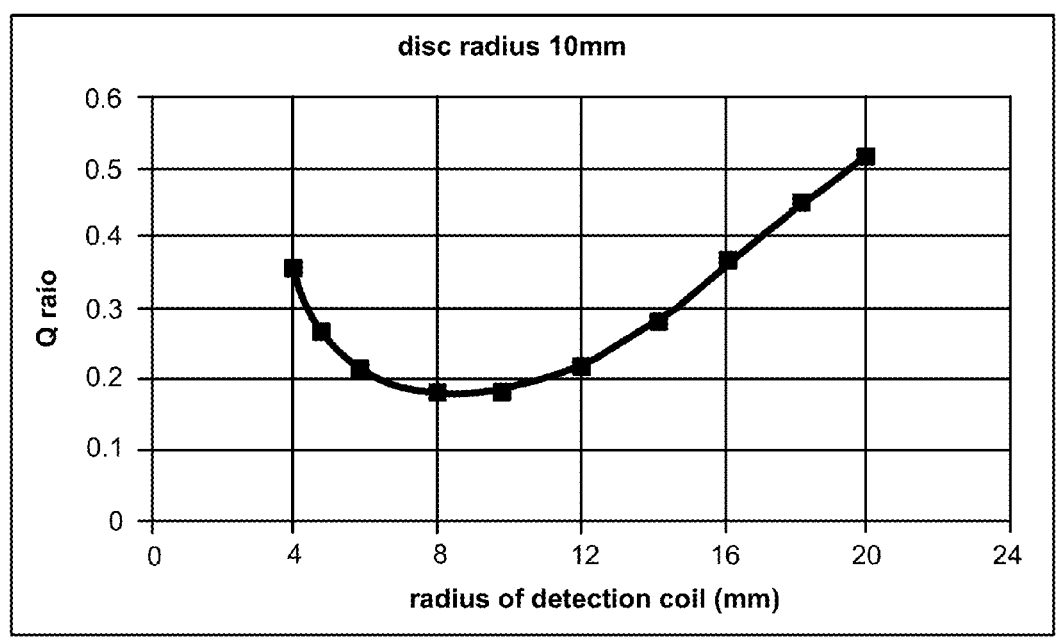
FIG. 6 is a graph illustrating coupling between a foreign object detection coil and a foreign object as a function of detection coil radius for an assumed foreign object radius of 10 mm, in an embodiment.

FIG. 6 illustrates a simulation of the operation of the system 500 used to detect a small foreign object in a wireless charging system. In taking the results of FIG. 6, a steel disc with the radius of 10 mm is used to represent many kinds of foreign object 520, such as a coin, a battery, a ring, etc. The x-axis in FIG. 6 represents the increasing radius of the detection coil (e.g., 504), while the y-axis represents the ratio between Q2 and Q1 (i.e., Q2/Q1). This ratio is introduced in FIG. 2 and needs no further description here. As explained above, a lower value of Q2/Q1 is better for detecting foreign objects. As shown in FIG. 6, when the radius of the detection coil is close to the radius of the disc, the ratio is the lowest and therefore the ability to detect the foreign object is optimal.

Another advantage of using detection coils 504 that are approximately the size of the foreign object 520 and smaller than the transmitter coil 508 is the shorter detection distance for the smaller coils, particularly in the Z-direction (the direction of power transfer, perpendicular to interface 414). Referring again to FIG. 4(a), the foreign object is often on or very close to the interface 414 in the Z-direction, while the friendly parasitic components 424 are further away from the interface. It is therefore beneficial to have the detection coil 504 sensitive to foreign objects 520 that are close to the interface 414, but insensitive to any objects that are further away from the interface.

Figure 7:
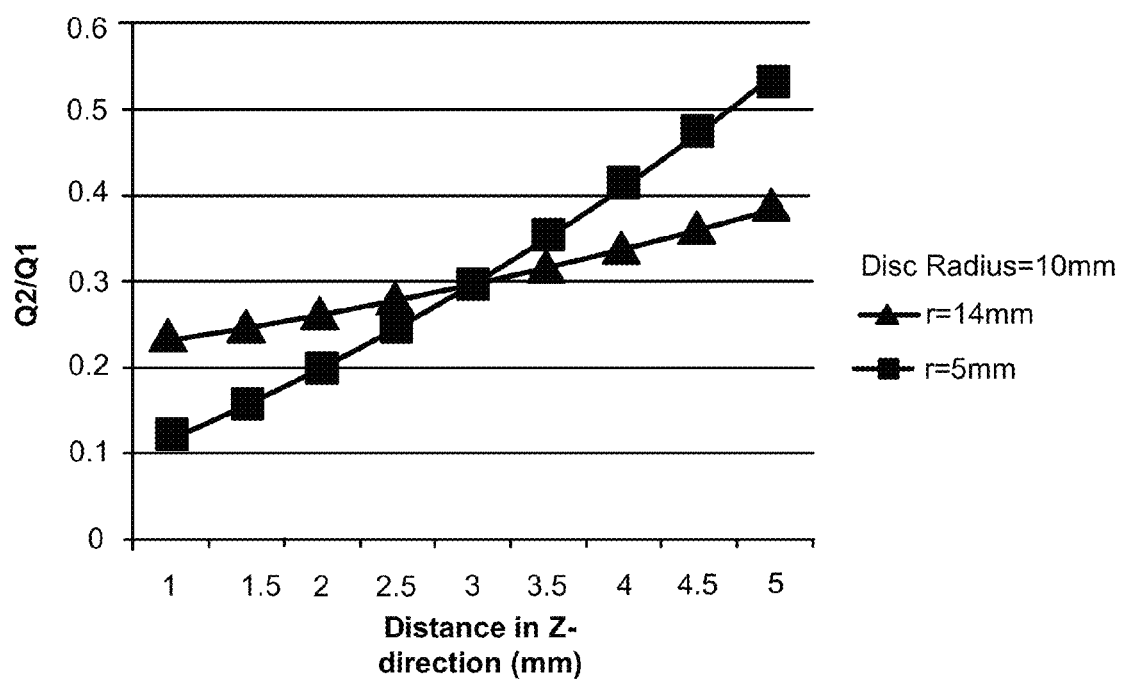
FIG. 7 is a graph depicting electromagnetic coupling between a foreign object detection coil and a foreign object as a function of Z-axis distance from the detection coil for two different radius (or diameter) coils, in an embodiment.

FIG. 7 illustrates the comparison of the difference in detection depth of different sized coils. The results shown in FIG. 7 are for a situation in which a steel disc with the radius of 10 mm is chosen as the representative foreign object. Two detection coils, one with radius of 5 mm and the other with 14 mm, are tested and compared. The x-axis represents the distance between the detection coil 504 and the foreign object 520, while the y-axis represents the value of Q2/Q1. As shown in FIG. 7, with the small detection coil, the value of Q2/Q1 increases much faster. In other words, the detection capability of such small detection coils diminishes faster with the increase of distance than a detection coil with larger radius. Therefore, for the purpose of detecting foreign objects, rather than friendly parasitic components located at further distance from the transmitter, smaller coils provide fewer false positive results because they are less likely to detect friendly parasitic components.

Another advantage of using an array of multiple small detection coils is that an array can be used to determine the location of the foreign object 520. The location can be determined by comparing the responses of each of the detection coils 504 in the array. Since the detection coils are smaller than the power transmitter coils, the location of the foreign objects can be determined with an accuracy that is better than the size of the power transmitter coils.

In some embodiments, the location of the foreign object is detected using an array of (partly) overlapping FOD coils. In other embodiments, using this location information, the transmitter can select from among several power transmitter coils to transmit power, thereby redirecting the field to prevent or reduce power transfer to the foreign object. In another embodiment, instead of adding an array of detection coils, only one detection coil or a small number of detection coils (fewer than those shown in FIG. 5) is placed at locations where the transmitted field is expected to be the strongest. For example, the detection coils may be concentrated in the center of the power transmitter coils.

Foreign object detection coils, such as coils 504 shown in FIG. 5, can be fabricated by coils wound with wires, by printed circuit board (PCB) coils, by flexible PCB coils, or in other suitable forms. For examples in which the transmitter coil is fabricated using a PCB, then the detection coil array can also be fabricated in the same PCB as the transmitter coil, but detection coils might be fabricated using different PCB layers from the transmitter coils. Although FIG. 5 shows that the foreign object detection coil array is on top of the power transmitter coil, the detection coil array can just as well be disposed below the transmitter coils or between multiple transmitter coils.

As mentioned above, the coupling between the targeted foreign object and the detection coil is dependent on the Z-distance and the relative size of the detection coil and the foreign object. The coupling is also a function of the position of the foreign object relative to the detection coil in the lateral direction (that is, in the x-y plane parallel to the interface 414), due to the shape of the electromagnetic field.

Figure 8A:
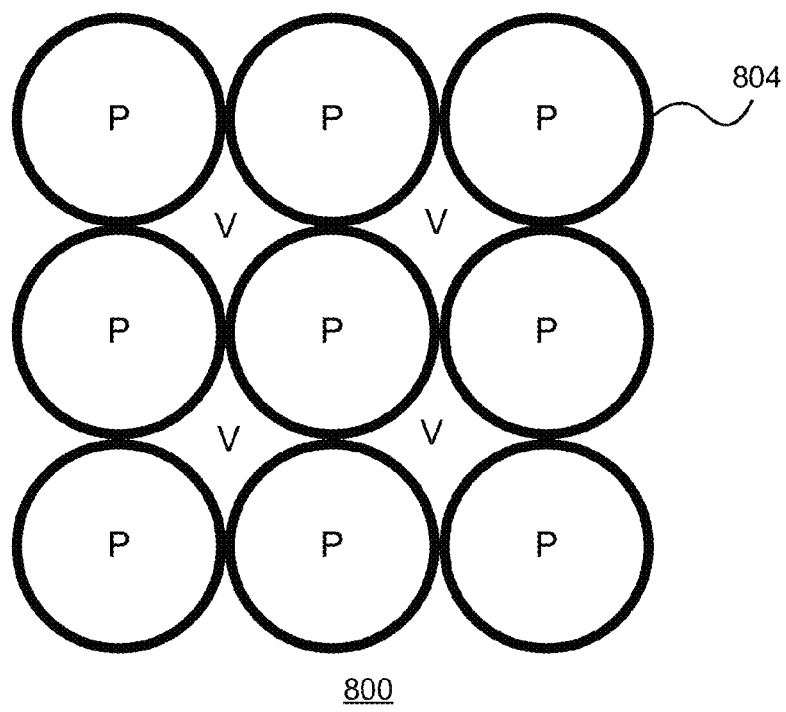
FIG. 8(a) is a plan view of a foreign object coil detection array, wherein the array is a single layer of detection coils, in an embodiment.
Figure 8B:
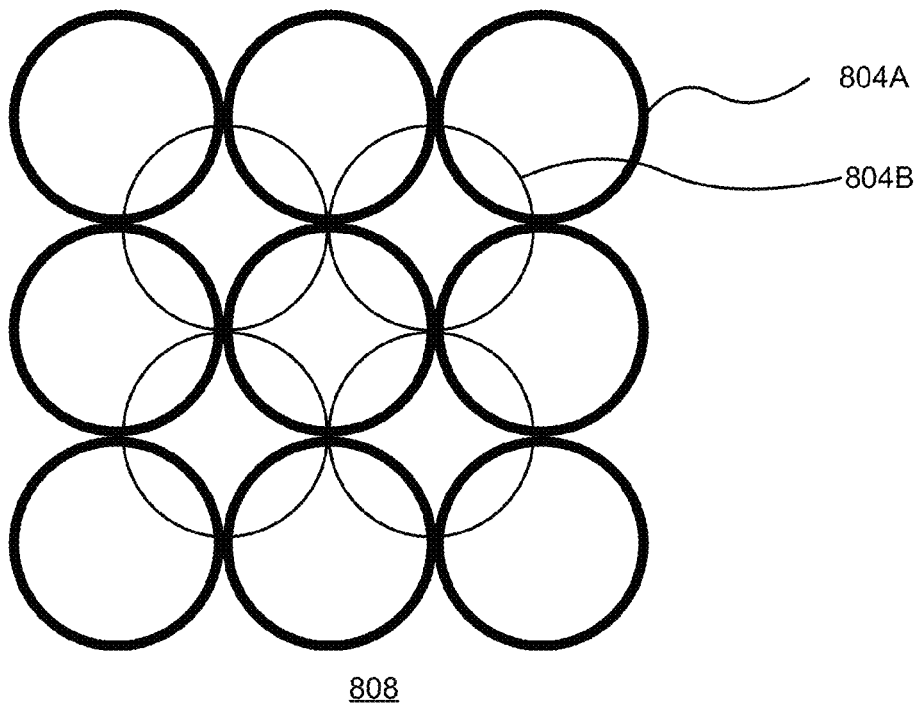
FIG. 8(b) is a plan view of a foreign object coil detection array, wherein the array is a double layer of detection coils, the second layer having an offset from the first layer in the lateral direction, in an embodiment.

FIGS. 8(a) and 8(b) illustrate another embodiment in which, instead of using a single layer detection coil array, a multilayer detection coil matrix can be used for more uniform detection capability over the whole interface area. For simplicity, only the detection coil array is shown in FIGS. 8(a) and 8(b). As shown in FIG. 8(a), the single layer detection coil array 800 has some detection peaks (marked as 'P') corresponding in this plan view to the center of each detection coil 804, and some detection valleys (marked as 'V') corresponding in this plan view to the location where the detection coils are less effective (lower coupling). When a foreign object is placed at a location corresponding to a 'V', it might not be detected. One solution is the use of multilayer detection coil array 808 as shown in FIG. 8(b). In this embodiment, the thick circles represent the coils 804A in a first layer, as shown in FIG. 8(a), and the thin circles represent the coils 804B in a second layer. In the lateral (x-y) direction, the two layers are overlapping but with an offset. The coils 812 in the second layer compensate the 'V's in FIG. 8(a), and result in more uniform detection capability. Other patterns are also possible. For example, the there may be three layers where each layer is hexagonally packed. Alternately, there may be four layers that are square packed but centered at (0,0), (0,L/2), (L/2,0) and (L/2,L/2), respectively, where L is the length of the square that defines the square packing Another embodiment can include coils that are not circular but are elliptic, hexagonal, or any other shape that encloses a particular 'sensing area'.

Figure 9A:
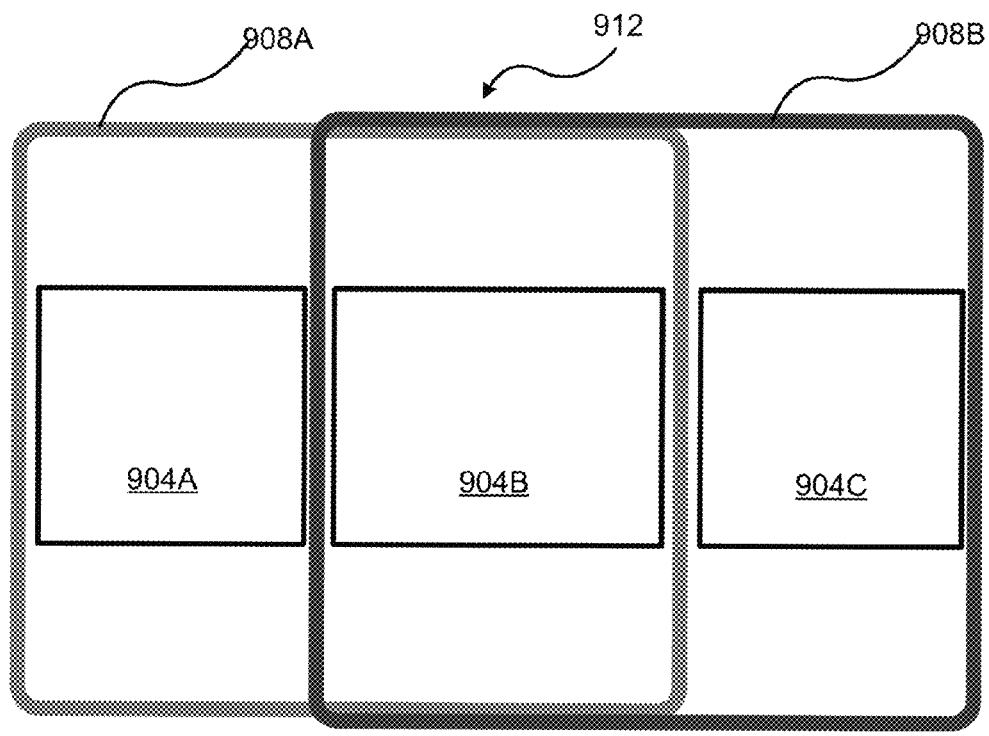
FIG. 9(a) is a plan view of two overlapping power transmitter coils defining three active areas, a foreign object detection coils disposed in each of the three active areas, in an embodiment.
Figure 9B:
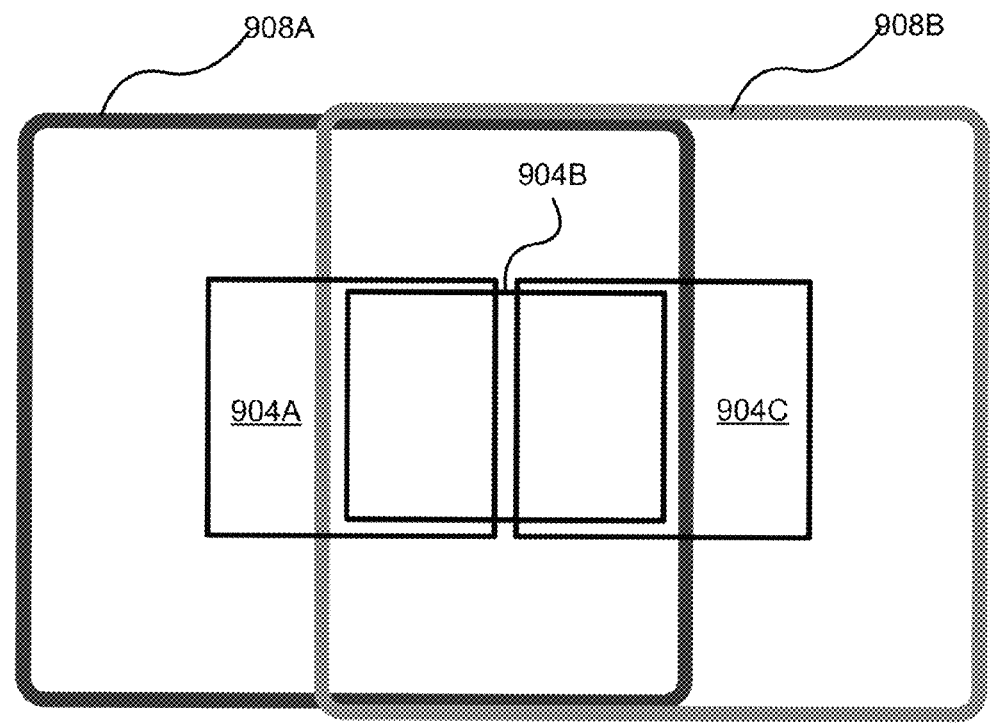
FIG. 9(b) is a plan view of two overlapping power transmitter coils defining three active areas, two foreign object detection coils disposed overlapping a third detection coil in the active area formed by the overlapping transmitter coils, in an embodiment.

In another embodiment, the transmitter system uses more than one power transmitter coil. The power transmitter coils can also be arrayed, as described above with respect to the FOD coils. As shown in the examples of FIGS. 9(a) and 9(b), the two power transmitter coils 908A and 908B are configured in a multilayer structure, overlapping in a center portion 912. Although FIG. 9 only shows two transmitter coils 908, other embodiments of the system include more than two power transmitter coils. The system also includes three foreign object detector coils 904A, 904B, 904C that are positioned within each of the three regions defined by the two power transmitter coils 908, corresponding to operational conditions in which one or both of the power transmitter coils 908 are active.

In the example shown in FIG. 9(a), the three detection coils 904A, 904B, 904C are distributed in one layer. As shown in FIG. 9(b), detection coils 904A, 904B, 904C are configured in multiple layers. The foreign object detection coils 904A, 904B, 904C can be selected for use based on the receiver coil position and the excitation of one or more selected transmitter coils 908. For example, if transmitter coil 908A is excited, only detection coils 904A and 904B will be used to detect foreign objects. If transmitter coil 908B is excited, only detection coils 904B and 904C will be used to detect foreign objects. If both transmitter coils 908A and 908B are excited, it is optional to check only detection coil 904B to determine the presence of foreign objects in the area with strongest electromagnetic field from the transmitter coils 908A and 908B. Optionally, all detection coils 904A, 904B, 904C can be used to detect foreign objects to protect the whole area covered by the transmitter coils 908A and 908B. The advantage of such 'localized' foreign object detection is clear. By dynamically localizing the foreign object detection coil with the position of the active (excited) transmitter coil, the foreign object detection coil concentrates its detection inside the region where the field is.

Power transmitter coils 908 can also be activated depending on which detections coils 904 detect foreign objects. For example, referring to FIG. 9(a), assume that the power receiver coil is located above the center portion 912 so that either power transmitter coil 908A or 908B could be used to transfer power to the receiver. If detection coil 904C detects a foreign object while detection coil 904A does not, then a controller may decide to activate only power transmitter coil 908A and not 908B.

Adjusting Detection Depth of the Detection Coil

Figure 10:
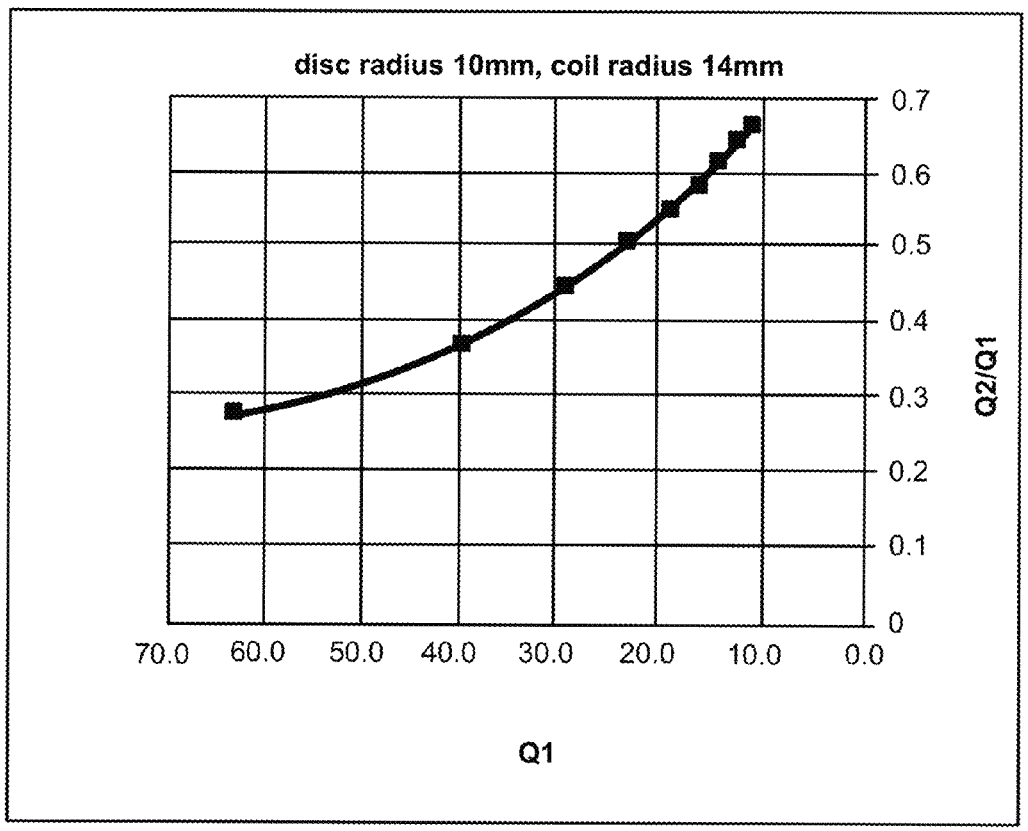
FIG. 10 is a graph showing a change of Q2/Q1 with the change of the Q1 due to adding a resistor to a resonant circuit, in an embodiment.

In addition to the above embodiments in which the detection distance in the Z-direction can be adjusted according to detection coil size, other parameters can also be changed to adjust the detection distance in the Z-direction. For example, it is possible to add a resistor connected in series with the detection coil (or in series with the capacitor) in the circuits shown in FIG. 2(a) and FIG. 2(b). FIG. 10 shows the change of Q2/Q1 with the change of the Q1. By adding the resistor, the quality factor of the resonant tank circuit is decreased. That is, low values of Q1 along the x-axis correspond to high values of added resistance. As seen from FIG. 10, the value of Q2/Q1 increases with decreasing Q1. In other words, if the quality factor of the resonant circuit is decreased (by adding more resistance), the detection distance is reduced. In another approach, the detection distance can also be adjusted with the change of oscillating frequency. It should be noted that the oscillating frequency (i.e., resonant frequency) of the resonant tank circuit is determined by the values of the detection coil load (L) and the capacitance of the capacitor (C), and is equal to $$\frac{1}{2\pi\sqrt{LC}}$$

Figure 11:
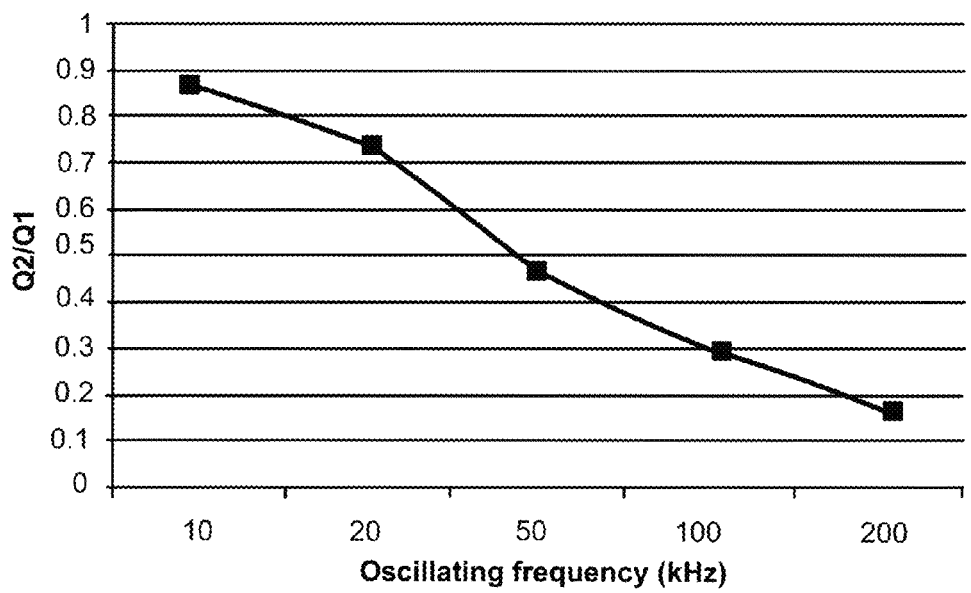
FIG. 11 is an illustration of the change of Q2/Q1 with the change of oscillating frequency, thereby reducing the detection distance of a detection coil, in an embodiment.

The adjustment of the oscillating frequency can be done by changing the capacitor values. FIG. 11 shows the change of Q2/Q1 with the change of oscillating frequency. It can be seen from FIG. 11 that with the decrease of oscillating frequency, the value of Q2/Q1 increases which means that the detection distance of the detection coil is reduced. The value of C can be increased by adding an additional capacitor in parallel to the capacitor in FIG. 2. With this technique a detection coil or coil array can be used to sense foreign objects of different sizes and/or at different distances in the z-direction.

It must be noted that the described FOD coil or coil array configurations are not only applicable to the detection method using decay in resonant circuit. Indeed, for any other detection method which detects the power loss or power dissipation in the foreign objects, such FOD coil or coil array can be used, and they always have the advantage of separating friendly parasitic components and foreign objects.

Impact of Receiver Circuit

In another aspect of embodiments described herein, the impact of a receiver circuit on foreign object detection is considered. As described above, in many wireless power transfer systems, there is communication or identification sent from a receiver to a transmitter to check for compatibility between the charging device and the device being charged. If the two are compatible, power is transferred. This means that the above foreign object detection takes place when a compatible receiver is present. This also means that the foreign object detection method considers the power loss in the receiver circuits.

Figure 12A:
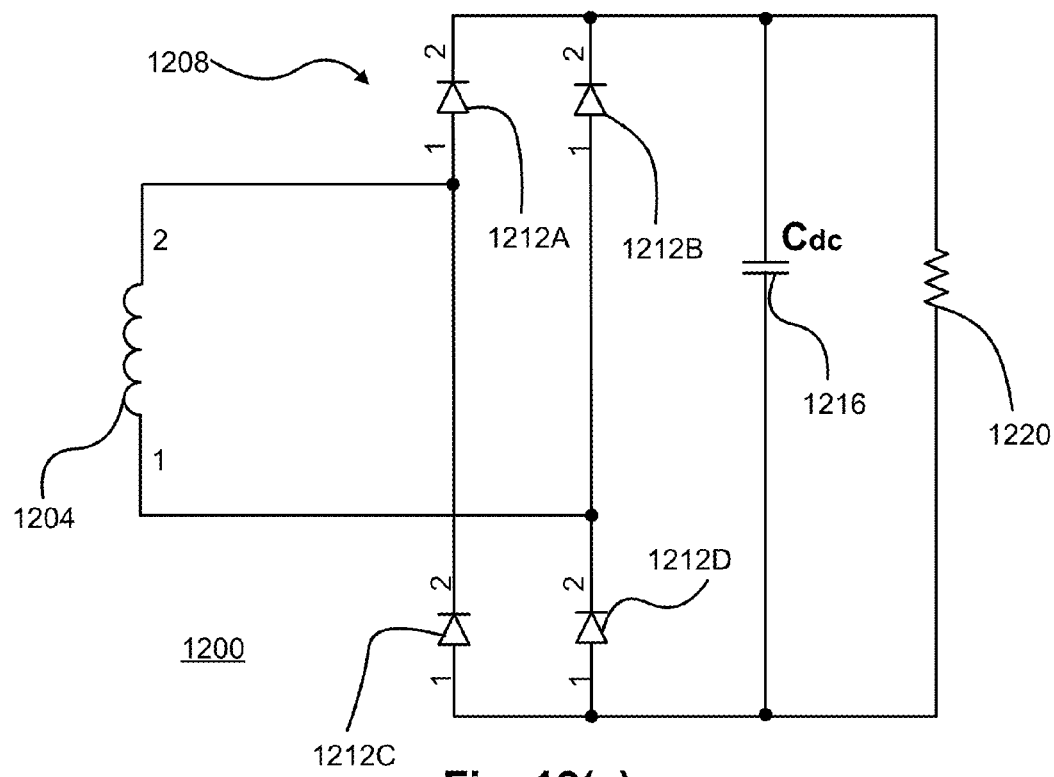
FIG. 12(a) is a circuit diagram of a receiver circuit used in a receiver, in an embodiment.

FIG. 12(a) shows a circuit diagram of a receiver circuit used in a receiver. The receiver circuit 1200 includes a power receiver coil 1204, a rectifier 1208 formed by diodes 1212A-D (collectively, 1212), a capacitor 1216, and a load 1220.

The power receiver coil 1204 receives AC power from a power transmitter coil (not shown). Through an optional resonant tank (not shown), the received power is transformed into DC power by the rectifier 1208 formed by the diodes 1212. The rectified power is provided to the load 1220. The receiver circuit 1200 is not restricted to receiving power from the transmitter coil, but also from foreign object detection coils during execution of the foreign object detection process. If the receiver 1200 consumes a measurable amount of power from the foreign object detection coil, the foreign object detection execution can incorrectly conclude that a foreign object is present. In one embodiment, the amplitude of the oscillation in the detection resonant circuit in FIG. 2 is limited to a very low value, so that the coupled voltage in the receiver 1204 is lower than the forward voltage of the diodes 1212 in the rectifier 1208. Once the coupled voltage is low, there is approximately no (or at least a negligible or non-noticeable) power flow into the load capacitor 1216 (having capacitance $C_{dc}$) and the load 1220. Limiting the oscillation amplitude in the detection resonant circuit can be done by, for example, reducing the initial voltage of the capacitor 208, $V_c$ (see FIG. 2), to an adequate value. In another embodiment, the oscillating frequency of the detection resonant circuit can be adjusted such that the oscillating frequency is far away from the resonant frequency of the receiver. This can further limit the power captured by the receiver 1200 from the foreign object detection coil.

Figure 12B:
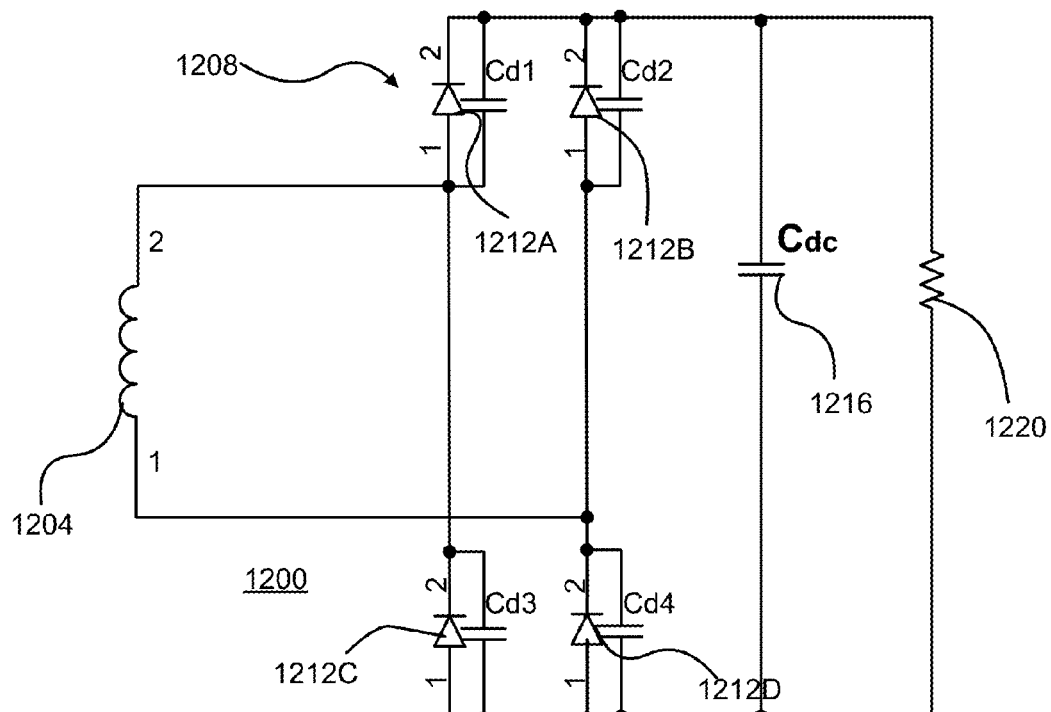
FIG. 12(b) is a circuit diagram of the receiver circuit of FIG. 12(a), also showing the parasitic capacitance of the rectifier diodes, in an embodiment.

Although it can be assumed in the above case that the diodes 1212 do not conduct electricity if the induced voltage in the receiver coil 1204 is lower than the forward voltage of the diodes, the leakage energy in the receiver circuit might still impact the result of the foreign object detection process. As shown in FIG. 12(b), the main contributor of leakage is the parasitic capacitance of the diodes 1212, as marked as $C_{d1}$, $C_{d2}$, $C_{d3}$ and $C_{d4}$.

Figure 13A:
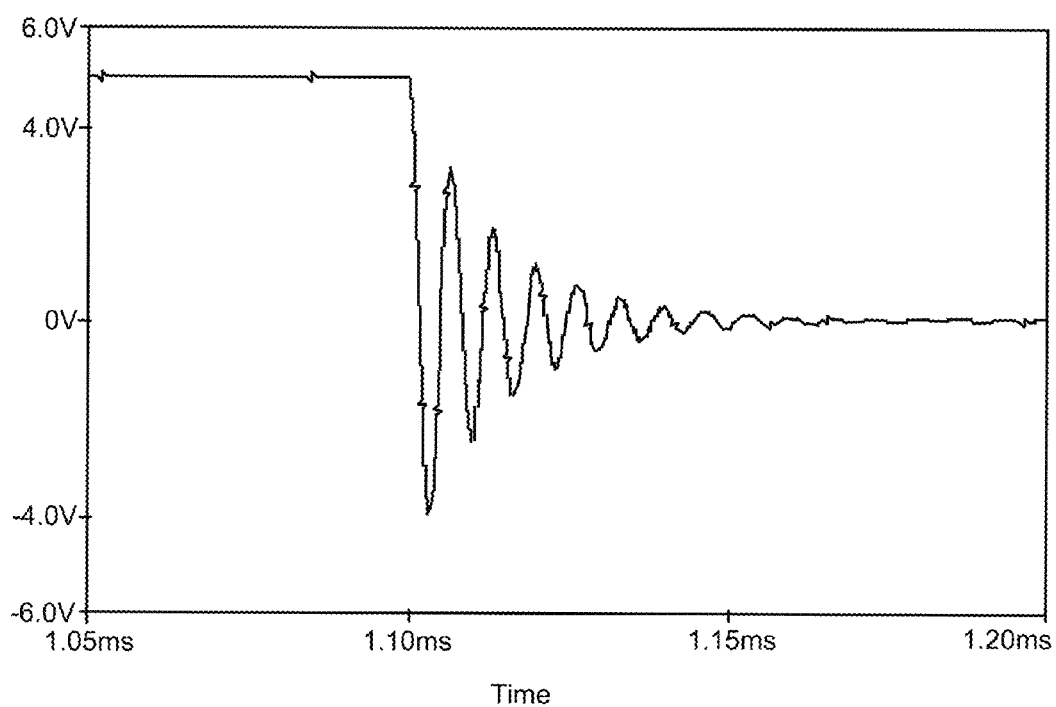
FIGS. 13(a)-(c) illustrate various voltage and current characteristics of a foreign object detection resonant circuit, in an embodiment.
Figure 13B:
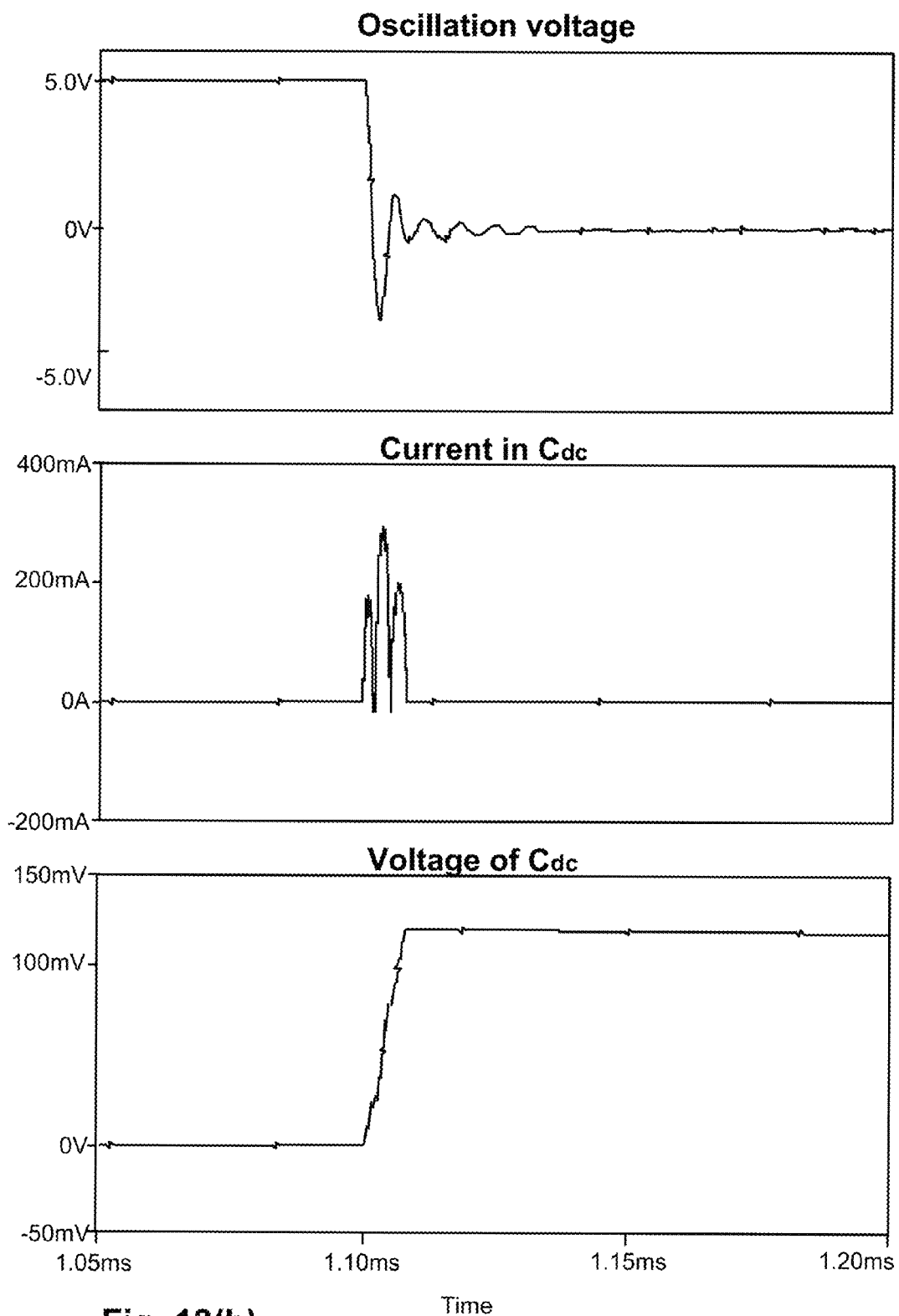

FIG. 13(a) shows the oscillation of the foreign object detection resonant circuit (see FIG. 2) if there is no foreign object, no friendly parasitic components, and no receiver. FIG. 13(b) shows the result when an "uncharged" receiver is present. An "uncharged" receiver means that the initial voltage of $C_{dc}$ in the receiver is equal or close to zero. By comparing the oscillation in FIG. 13(a) and FIG. 13(b), it is clearly seen that the oscillation amplitude in FIG. 13(b) decays much more quickly and the oscillation duration in FIG. 13(b) is shorter. The execution of the foreign object detection process may therefore falsely regard the receiver as a foreign object. FIG. 13(b) also shows the current flowing in $C_{dc}$ and the voltage across it during the foreign object detection process. It can be seen that some current does flow through the capacitor and charge it. This consumes the energy coming from the foreign object detection coil.

Figure 13C:
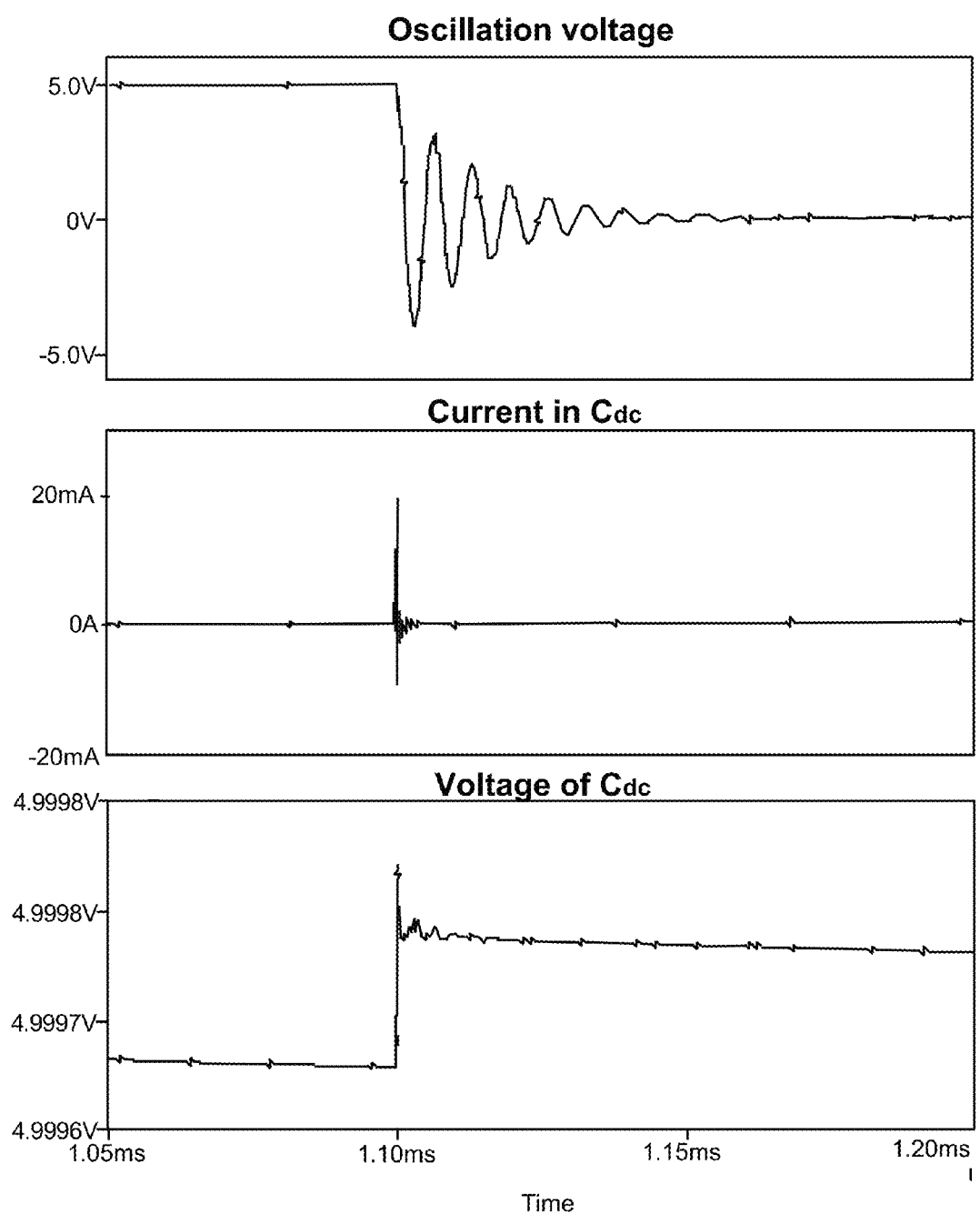

One embodiment to solve this issue is to "pre-charge" the receiver before the foreign object detection process starts. Such "pre-charge" can be done by injecting some power signal into the appropriate transmitter coil(s) for a short period. With the coupling between the appropriate power transmitter coil(s) and the receiver, some energy is transferred to the receiver, and pre-charges the receiver. In particular it will pre-charge the capacitor $C_{dc}$. FIG. 13(c) shows the resulting waveform when the receiver is pre-charged. By comparing FIG. 13(a) and FIG. 13(c), it is seen that the oscillation waveform between them is the same, and the receiver will not be falsely detected as a foreign object. FIG. 13(c) also shows the current flowing through $C_{dc}$ and the voltage across it. Compared to the current and voltage waveform shown in FIG. 13(b), there is almost no current and voltage change in FIG. 13(c).

It should be noted that the described 'pre-charge' is not only applicable to the detection method using decay in a resonant circuit. Indeed, for any other detection method which detects the power loss or power dissipation in the foreign objects, such 'pre-charge' can be used, and with the advantage of separating the power loss in foreign objects and receiver circuit.

The described foreign object detection approach is operated preferably when there is no power being transferred from transmitter to receiver (or vice versa), because the proposed foreign object detection process may have difficulty to differentiate between the transferred power and the power dissipation in a foreign object. One approach is to temporarily suspend the power transfer during execution of the foreign object detection process.

For example, either the transmitter or the receiver could request such timeout by sending a specific command. This could be, for example, a power interruption packet in which the device indicates that the transmitter should temporarily suspend power transfer for a specific time period (which can be part of the command). The resulting timeout can then be used to perform one or more cycles of the foreign object detection process. This power interruption can be very short such that a buffer capacitor on a receiver has enough stored energy to bridge the power transfer suspension, and no restart of the power transfer is needed.

It should be noted that although the use of the example power interruption packet is described in embodiments specifically for foreign object detection, it is not limited to this application. Another example is that the receiver may want to use a near field communication ("NFC") circuit, which might not work during wireless power transfer. By requesting a short suspension of power transfer, the near field communication circuit function can be done during this period.

Figure 14:
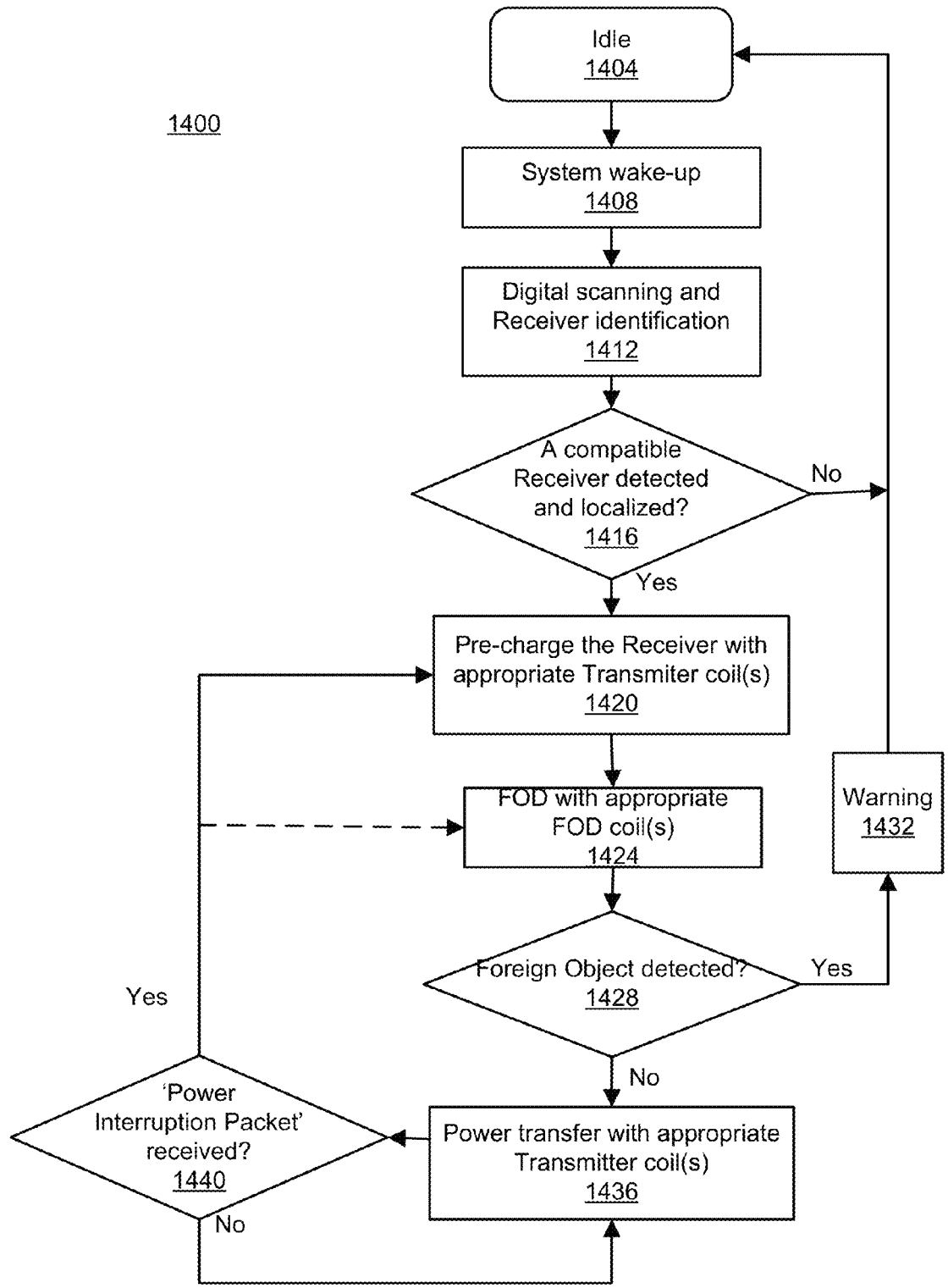
FIG. 14 is a method flow diagram of an example algorithm used by a foreign object detection circuit to detect a foreign object, in an embodiment.

FIG. 14 shows a flow chart of an exemplary method 1400 for a foreign object detection ("FOD" in the figure) algorithm. A transmitter may optionally begin the FOD process 1400 from an idle state 1404. The system can be "woken up" 1408 (using methods such as capacitive sensing, motion sensing or pulsing sensing, etc.), thereby leaving the idle state 1404. After the transmitter is woken 1408, it identifies 1412 a compatible receiver and finds the location of the receiver 1416. In examples in which the transmitter lacks multiple transmitter coils, digital receiver localization 1416 can be skipped.

As described above, once the compatible receiver is detected, it can be pre-charged 1420 with one or more power transmitter coils, as appropriate to the relative location and compatibility of the power receiver coils and power transmitter coils. Foreign object detection process is executed 1424 with the previously identified one or more appropriate FOD coils. If a foreign object is detected, optional warning feedback 1432 can be given to the user. Otherwise, the transmitter begins transferring power 1436 using the previously identified transmitter coils that are in an appropriate location and of an appropriate type to transfer power to the receiver. During the transfer of power 1436, if a power interruption packet is received 1440 (or, alternatively, when the transmitter decides to initiate an additional FOD execution), the transmitter executes the pre-charge of receiver 1420, and does an additional FOD execution again. Optionally, the pre-charge 1420 need not be performed when power transfer 1436 is already in progress. Instead, the process can proceed from receiving the power interruption packet 1440 to executing the foreign object detection process 1424, as shown by a dashed arrow. It should be noted that, for simplicity, the flow chart in FIG. 14 does not show a step indicating the end of the power transfer process.

Although all the proposed methods and improvements in this disclosure can be used together to achieve accurate foreign object detection in a wireless power transfer system, they may also be used individually or in combination.

Miscellaneous

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combination thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for these operations, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A wireless power charging system for charging a separate device having a power receiver coil, the wireless power charging system comprising:
at least one power transmitter coil configured to:
transmit, during a first time period, electromagnetic energy to pre-charge the power charging system through the power receiver coil in the separate device,
transmit, based on an indication of an absence of a foreign object disposed between the power transmitter coil and the power receiver coil, power by inductive coupling to the power receiver coil in the separate device, the power transmitter coil characterized by a transmitter coil dimension that is a lateral dimension of the power transmitter coil; and
a foreign object sensor including at least one foreign object detection (FOD) coil positioned at the center of the power transmitter coil, the FOD coil characterized by a FOD coil dimension that is the lateral dimension of the FOD coil and that is smaller than the transmitter coil dimension, the foreign object sensor configured to:
determine an initial amplitude level of an electromagnetic foreign object detection signal during a calibration operation when the foreign object is not disposed between the power transmitter coil and the power receiver coil,
generate, during a second time period subsequent to the first time period, the electromagnetic foreign object detection signal having a current amplitude level,
determine whether the current amplitude level of the electromagnetic foreign object detection signal is lower than the initial amplitude level, and
generate an indication of the presence of the foreign object disposed between the power transmitter coil and the power receiver coil responsive to a determination that current amplitude level is lower than the initial amplitude level, and otherwise generate the indication of the absence of the foreign object disposed between the power transmitter coil and the power receiver coil.

2. The system of claim 1, wherein the at least one FOD coil has a size similar to a size of a target foreign object.

3. The system of claim 1, wherein the at least one FOD coil comprises two or more FOD coils.

4. The system of claim 3, wherein each FOD coil is characterized by a FOD coil dimension that is the lateral dimension of the FOD coil and that is smaller than the transmitter coil dimension, the system further comprising a location unit in communication with the FOD coils, the location unit using a set of detection responses from the FOD coils to identify a location of the foreign object with an accuracy that is better than the transmitter coil dimension.

5. The system of claim 3, wherein the two or more FOD coils comprise an array of FOD coils.

6. The system of claim 3, wherein the two or more FOD coils comprise two layers of FOD coils.

7. The system of claim 3, wherein the at least one power transmitter coil comprises two or more power transmitter coils.

8. The system of claim 1, wherein the lateral dimension of the FOD coil is not more than 25 mm.

9. The system of claim 1, wherein the lateral dimension of the FOD coil is approximately 20 mm.

10. The system of claim 1, wherein the power transmitter coil and the FOD coil are rectangular and the lateral dimension of the coil is a length of a side of the coil.

11. The system of claim 1, wherein the power transmitter coil and the FOD coil are circular and the lateral dimension of the coil is a diameter of the coil.

12. The system of claim 1, wherein the lateral dimension of a coil is a maximum width of the coil.

13. The system of claim 1, wherein the lateral dimension of a coil is an area of the coil.

14. The system of claim 1, wherein the transmitter coil dimension is at least two times the FOD coil dimension.

15. The system of claim 1, further comprising:
    detection circuitry connected to the FOD coil, the detection circuitry configured for detecting the foreign object based on a response of the foreign object sensor.

16. The system of claim 15, wherein the foreign object sensor is a resonant circuit that detects the foreign object based on a decay of the response of the resonant circuit.

17. The system of claim 15, wherein the foreign object sensor is a resonant circuit that detects the foreign object based on a change in a Q-factor of the resonant circuit.

18. The system of claim 1, wherein the at least one FOD coil comprises two or more FOD coils, the at least one power transmitter coil comprises two or more power transmitter coils, the system further comprising:
    a controller configured to select power transmitter coils for activation based on which FOD coils have detected foreign objects.

19. The system of claim 1, wherein the at least one FOD coil comprises two or more FOD coils, the at least one power transmitter coil comprises two or more power transmitter coils, the system further comprising:
    a controller configured to select which FOD coils to activate based on which power transmitter coils are transmitting power.

20. A wireless power charging system for charging a separate device having a power receiver coil, the wireless power charging system comprising:
    at least one power transmitter coil configured to:
        transmit, during a first time period, electromagnetic energy to pre-charge the power charging system through the power receiver coil in the separate device,
        transmit, based on an indication of an absence of a foreign object disposed between the power transmitter coil and the power receiver coil, power by inductive coupling to the power receiver coil in the separate device, the power transmitter coil characterized by a transmitter coil dimension that is a lateral dimension of the power transmitter coil; and
    a foreign object sensor including at least one foreign object detection (FOD) coil positioned at the center of the power transmitter coil, the FOD coil characterized by a FOD coil dimension that is the lateral dimension of the FOD coil and that is smaller than the transmitter coil dimension, the foreign object sensor configured to:
        determine an initial oscillation duration of an electromagnetic foreign object detection signal during a calibration operation when a foreign object is not disposed between the power transmitter coil and the power receiver coil,
        generate, during a second time period subsequent to the first time period, the electromagnetic foreign object detection signal having a current oscillation duration,
        determine whether the current oscillation duration of the electromagnetic foreign object detection signal is shorter than the initial oscillation duration, and
        generate an indication of the presence of the foreign object disposed between the power transmitter coil and the power receiver coil responsive to a determination that current oscillation duration is shorter than the initial oscillation duration, and otherwise generate the indication of the absence of the foreign object disposed between the power transmitter coil and the power receiver coil.

* * * * *